United States Patent [19]
Tourtellotte

[11] Patent Number: 5,961,248
[45] Date of Patent: Oct. 5, 1999

[54] STRUCTURAL MEMBER CONNECTION AND METHOD

[76] Inventor: Mills C. Tourtellotte, 1114 Inwood Dr., Richmond, Tex. 77469-4902

[21] Appl. No.: 08/844,253

[22] Filed: Apr. 18, 1997

[51] Int. Cl.⁶ .................................................. F16B 2/08
[52] U.S. Cl. ........................... 403/400; 403/385; 403/398
[58] Field of Search .................................. 403/385, 388, 403/394, 400, 391, 389, 399, 384, 390, 346, 398, 396; 256/68, 69, 65; 248/61, 62; 211/182; 24/278, 274 WB, 275; 52/665; 411/400–401

[56] References Cited

U.S. PATENT DOCUMENTS

| | | | |
|---|---|---|---|
| 1,835,338 | 12/1931 | Rossman | 403/385 |
| 2,655,088 | 10/1953 | Charley | 403/400 X |
| 2,720,016 | 10/1955 | Johannsen | 403/398 |
| 3,107,932 | 10/1963 | Johnson et al. . | |
| 3,456,412 | 7/1969 | Decombas | 403/400 X |
| 4,060,150 | 11/1977 | Hughes . | |
| 4,129,393 | 12/1978 | Sickler . | |
| 4,141,414 | 2/1979 | Buttgereit . | |
| 4,193,708 | 3/1980 | Kitchen et al. . | |
| 4,197,090 | 4/1980 | Williams et al. . | |
| 4,248,488 | 2/1981 | Sable | 403/157 X |
| 4,439,052 | 3/1984 | Wallther . | |
| 4,445,307 | 5/1984 | Puccinelli et al. . | |
| 4,534,448 | 8/1985 | Trainer . | |
| 4,592,186 | 6/1986 | Braginetz | 403/400 X |
| 5,000,290 | 3/1991 | Seely . | |
| 5,111,770 | 5/1992 | Weelink | 403/390 X |
| 5,127,758 | 7/1992 | Kreusel . | |
| 5,180,124 | 1/1993 | Pascor . | |
| 5,215,281 | 6/1993 | Sherman . | |
| 5,259,690 | 11/1993 | Legge . | |
| 5,274,888 | 1/1994 | Payne . | |
| 5,303,887 | 4/1994 | Hasty et al. . | |
| 5,427,465 | 6/1995 | Sato . | |
| 5,472,254 | 12/1995 | Wander . | |

FOREIGN PATENT DOCUMENTS

| | | | |
|---|---|---|---|
| 495157 | 4/1950 | Belgium | 403/385 |
| 1297819 | 5/1962 | France | 403/400 |
| 1337147 | 7/1963 | France | 403/400 |
| 431754 | 12/1948 | Italy | 403/400 |
| 384669 | 12/1932 | United Kingdom | 403/385 |
| 2241735 | 9/1991 | United Kingdom | 403/399 |

*Primary Examiner*—Harry C. Kim
*Attorney, Agent, or Firm*—Kenneth L. Nash

[57] ABSTRACT

A structural member connection and method is disclosed for quickly securing/unsecuring pipe connections wherein the respective pipes are typically in orthogonal relationship with each other. The pipes to be connected may be of different diameter and/or cross-sectional shape. The connection includes at least one preferably fitted pipe strap member for each pipe and at least four fasteners with one fastener being located in each quadrant formed by the orthogonal intersection of two pipes. The pipe strap member is selected to mate to the diameter pipe used. In the alternative, U-bolt members selected to mate to the respective pipes may be used in place of one set of pipe straps. Tubular standoffs may be used in conjunction with the fasteners to provide adjustable clamping strength.

18 Claims, 6 Drawing Sheets

STRUCTURAL MEMBER CONNECTION AND METHOD

BACKGROUND OF THE INVENTION

1. Field of the Invention

The present invention relates generally to quickly and reliably connecting structural members, such as tubes and pipes made from various materials such as metal and plastics. The structural members are supported in an orthogonal position at the connection. More particularly, the invention relates to novel apparatus and methods for using various types and combinations of fitted but inexpensive pipe straps, along with multiple fasteners, preferably at least four fasteners for each structure connection, for quickly making structural connections that may also include structural member connections with different diameter tubulars or solid structural members, and which include components that are removable or replaceable without moving the structural members.

2. Description of the Background

Tubular members have been used in the past to construct various types of structures that may include buildings, trailers, scaffolding, shelving, signs, and the like. By tubular members, it is meant herein to generally describe elongate beams that may include a wide range of typically tubular, but possibly solid, beam members. Tubular members may have various cross-sectional shapes but most normally have circular, square or rectangular cross-sections. Preferably, the tubular members are metallic or plastic but may also be comprised of wood, fibers, compounds, or any other suitable construction or combinations of materials. However, the tubular members could also be formed of any synthetic materials including but not limited to polymers, fibers, fiber reinforced, elastomeric, resin, rubber, rubber compounds, PVC, silicon, quartz, glass, and any other petroleum, natural, or synthetic-based materials or compounds. Pipes as used herein are a type of tubular member that include round tubes and have sufficient wall thickness and fixed diameters that are acceptable to receive standard pipe threads. Tubes may be of any wall thickness, diameter, square or rectangular, or most any shape. Standard plastic pipes have fixed wall thickness and diameters, the same as steel pipes, but standard plastic pipes are normally glued together rather than threaded together and so do not normally receive standard pipe threads.

Metallic or plastic tubular members themselves are normally quite strong, but the means for connecting the tubular members often have shortcomings that limit the desirability of using such tubular elements for general construction purposes. Such shortcomings include cost per connection, flexibility of assembly whereby the connection requires that components be threaded upon the tubulars thereby limiting construction flexibility, difficulty in connecting different diameter tubulars whereby highly specialized and expensive components are required, and speed of assembly.

Referring to the cost problem alone, at the time of this writing, a single standard connector for an orthogonal type fitting may typically cost in the range of about $30 to $40 dollars. More complex fittings may be considerably more expensive. Therefore, the cost of the connectors is itself a basic problem that may make a tubular structure prohibitively expensive.

Another problem with basic construction materials or methods is that they often are not adapted to take advantage of modern construction devices that have become prevalent only in the last five years or so. For instance, modern workman typically carry high speed electric nut drivers and the like that should be completely utilized to achieve the highest rapidity of building frame construction.

Because the strong tubular braced structure frames have many construction advantages, numerous inventors have attempted to overcome the problems related to connecting the tubular members together as can be seen from the patents listed hereinafter:

U.S. Pat. No. 3,107, 932, issued Oct. 22, 1963, to W. J. S. Johnson et al., discloses a single screw lock connection for structural members which uses a single screw and provides locking action to prevent slippage of connected members whereby locking action increases with increasing load.

U.S. Pat. No. 5,215,281, to C. A. Sherman, issued Jun. 1, 1993, discloses a two-piece cushion insert for a U-bolt clamp assembly for securing large diameter elongate cylindrical members, such as pipe, tubing conduit or hose, to a support surface.

U.S. Pat. No. 5,274,888, to W. A. Payne, issued Jan. 4, 1994, discloses a saddle type pipe clamp that is adjustable to a wide range of pipe diameters and includes a saddle portion formed by a pair of complementary saddle elements of channel stock.

U.S. Pat. No. 5,427,465, to M. Sato, issued Jun. 27, 1995, discloses a clamp fitment that includes a pair of holding members each capable of clamping a pipe section, a coupler mounted between both, and a lock mechanism for restraining the relative rotation of the holding members. This clamp provides both orthogonal type and swivel type pipe connections.

U.S. Pat. No. 5,259,690, to P. Legge, issued Nov. 9, 1993, discloses a scaffold coupler that is actuated by an over-center lever mechanism and is comprised of resilient plastics.

U.S. Pat. No. 5,180,124, to M. Pascor, issued Jan. 19, 1993, discloses a clamp for fastening cylindrical elements that comprises a frame in two parts.

U.S. Pat. No. 4,534,448, to P. C. Trainer, issued Aug. 13, 1985, discloses a scaffold clamp having a press screw extending longitudinally therethrough for exerting pressure against the edges of enclosed planks to stabilize the platform comprised thereof.

U.S. Pat. No. 4,445,307, to J. S. Puccinelli et al., issued May 1, 1984, discloses a scaffold joint for connecting the ends of horizontal scaffold members to vertical scaffold members.

U.S. Pat. No. 4,439,052, to H. Wallther, issued Mar. 27, 1984, discloses a device for coupling together laterally directed scaffold elements and uprights or the like. A hook-shaped member is situated at one end and is adapted to hook into the engageable member.

U.S. Pat. No. 5,127,758, to U. Kreussel, issued Jul. 7, 1992, discloses a pipe joint for joining several pipes used in a pipe grid structure. Each pipe is connected by way of connecting member inserted into its interior from the end of the pipe and by way of a clamping device with two opposing clamping jaws.

U.S. Pat. No. 5,472,254, to K. V. Wander, issued Dec. 5, 1995, discloses a scaffolding hoist coupling for lifting a scaffolding component having an operably connected post fitting with at least two pins extending outwardly.

U.S. Pat. No. 4,193,708, to R. M. Kitchen, issued Mar. 18, 1980, discloses a fitting adapted to be secured to a length of scaffold tube and to clamp the scaffold tube to a girder.

U.S. Pat. No. 4,179,090, to Williams et al., issued Dec. 18, 1979, discloses a scaffolding bracket having a horizontal member arranged to act as a support for scaffold boards and a vertical member arranged to lie adjacent a vertical surface.

U.S. Pat. No. 4,140,414, to K. Buttgereit et al., issued Feb. 20, 1979, discloses a wedge-clamped scaffold joint for connecting the ties to the uprights of a scaffolding and having a plurality of vertically elongated openings in the uprights, an end projection on a wedge-shaped end plate, and a wedge element that is permanently mounted on the projection.

U.S. Pat. No. 4,129,393, to J. R. Sickler, issued Dec. 12, 1978, discloses a pair of scaffold lumber clamps including a pair of elongated generally parallel strap members with adjustable clamps.

U.S. Pat. No. 4,060,150, to P. Hughes, issued Nov. 29, 1977, discloses a ladder kit with a plurality of parts including elongated tubular side rails and rectangular frame sections that fasten the side rail sections into coplanar pairs.

U.S. Pat. No. 3,969,871, to R. L. Ewers, issued Jul. 20, 1976, discloses a construction unit for interconnecting timbers with tubes of smaller diameters and whereby the timbers may be connected directly to one another in parallel or orthogonal relationship.

U.S. Pat. No. 5,000,290 to P. D. Seely, issued Mar. 19, 1991, discloses a scaffold flooring attachment clamp utilizing two identical rotably connected members to attach a cross-member of a scaffold supporting structure to a scaffold flooring with each identical members having a semi-circular jaw portion and a tab portion.

U.S. Pat. No. 5,303,887 to W. E. Hasty et al., issued Apr. 19, 1994, discloses a universal pipe support and hanger system for multiple conduits and electrical lines in new buildings.

Although the above-listed patents address problems relating to structural members and connections thereof, they do not address the long felt need for a low cost connector that may or may not be used with different diameter pipes and have other advantages as discussed above.

Consequently, there remains a need for a low cost, readily available, easily manufactured, quickly assembled apparatus and method for connecting structural members together that operates to provide a reliable connection under all types of loads that is safe enough for use in human habitats. Those skilled in the art have long sought and will appreciate the present invention that addresses these and other problems.

SUMMARY OF THE INVENTION

The present invention provides an improved, lower cost, apparatus and method for reliably securing together structural members, such as tubular pipes. The connection may be used for the construction of building frames, scaffolds, or other desired fabrications. While numerous alternative embodiments of the present invention are described in detail hereinafter, a presently preferred embodiment of the invention provides a construction arrangement to reliably secure first and second structural members each laid angularly adjacent another. To this end is provided a first pair of elongate strap members, each of the first pair of strap members having a cross-section that mates to an outer profile of the first structural member. The first pair of elongate strap members extends around the outer profile of the first structural member and is positioned so as to be distal the second structural member. The strap members are positioned substantially parallel with respect to each other. Several embodiments of the present invention include strap members with an ear at each end thereof with a mounting hole therein such that each strap member has two mounting holes. Therefore, the first pair of elongate strap members has four mounting holes.

A second pair of elongate mounting members is provided with each of the elongate mounting members having a cross-section that mates to an outer profile of the second structural member that is distal the first structural member. Each of the second pair of elongate mounting members extends around the outer profile of the second structural member and each of the elongate mounting members are parallel with respect to each other.

A fastener is provided at each of the four mounting holes, respectively, to secure the first and second pairs of elongate mounting members together. The fastener may include a first threaded insert member section that extends through a respective first of the four mounting holes and a first threaded receptor element for engaging the first threaded member section. To enhance speed of assembly, a threaded element may be welded to the first pair of elongate strap members at each of the four mounting holes so that only the nut or bolt, as appropriate, need be connected thereto thereby freeing one of the construction worker's hands.

The second pair of elongate mounting members may comprise several different embodiments of the invention. For instance, it may comprise a second pair of elongate strap members substantially similar to the first pair of elongate strap members except for any modifications made as discussed above as, for instance, the welded nut or bolt.

The second pair of elongate mounting members may also include first and second U-bolt members where each of the first and second U-bolt members mate to the outer profile of the second structural member. The first and second U-bolt members are mounted transverse with respect to the first pair of elongate strap members. Each of the first and second U-bolt members preferably have threaded ends that extend, respectively, through the four mounting holes.

To enhance the ability to tighten the connection, and at a slight additional cost, four cylindrical members may be provided where each of the cylindrical members has a hole therethrough and each is aligned to a respective one of the four mounting holes. Each of the cylindrical members is permanently connected, as by welding or other methods, to a respective of the first pair of strap members. For this embodiment, each of the first and second U-bolt members has threaded a threaded end that extends through respective of the four mounting holes and the four cylindrical members.

In the present invention, the first and second structural members have corresponding first and second diameters, and the first and second diameters may be unequal.

In operation, a method is provided for securing at least one, and preferably first and second structural members orthogonally with respect to each other. The first and second structural members are placed adjacent each other so as to be in an orthogonal relationship with each other. First and second straps are placed around the first member so that the straps are substantially parallel to the second member and to each other. Third and fourth straps are placed around the second member and are substantially parallel to the first member and to each other. The corresponding ends of the first and second straps are secured or fastened, by some means, to the third strap. Likewise, the corresponding ends of the first and second straps are secured to the fourth strap. Preferably, the straps are secured together by relatively rotating threaded members, such as nuts and bolts.

To enhance assembly time, two threaded members, such as nuts are welded to the first strap, and two additional threaded members are welded to the second strap.

For additional support of some embodiments of the invention, it may be desirable to also provide for placement of a fifth strap across ends of the first strap, and a sixth strap across ends of the second strap.

In one especially low cost embodiment of the invention, substantially similar straps are used for the first, second, third, and fourth straps and may differ in substance only in that the threaded members, such as nuts, are welded to the first and second straps. As noted above, the first and second structural members may be selected to have different diameters.

It is an object of the present invention to provide an improved structural connection and method.

It is another object of the present invention to provide a low cost, readily available structural connector and method.

It is yet another object of the present invention to provide a structural member that is quickly and conveniently assembled.

A feature of the present invention are the two pairs of straps, each pair orthogonal with respect to each other, used to support two tubular members that are also orthogonal with respect to each other.

Another feature of the present invention is the various types of straps used wherein the two pairs of straps may be substantially identical or may be significantly different whereby only one pair has mounting holes.

An advantage of the present invention is the relative low cost of the resulting connection.

Another advantage of the present invention is the flexibility of the connection that allows the connection to be removed without removing the position of the tubulars.

Yet another advantage of the present invention is that the concept may readily adapted without significant extra cost or time to be used with different diameter tubulars.

These and additional objects, features, and advantages of the present invention will be apparent to those skilled in the art especially after review of the technical drawings, the descriptions and discussions given herein, as well as the appended claims.

While the present invention will be described in connection with presently preferred embodiments such as those described in the above-designated figures, it will be understood that it is not intended to limit the invention to those embodiments. On the contrary, it is intended to cover all alternatives, modifications, and equivalents included within the spirit of the invention and as defined in the appended claims.

DESCRIPTION OF THE PREFERRED EMBODIMENTS

Figure 1A:
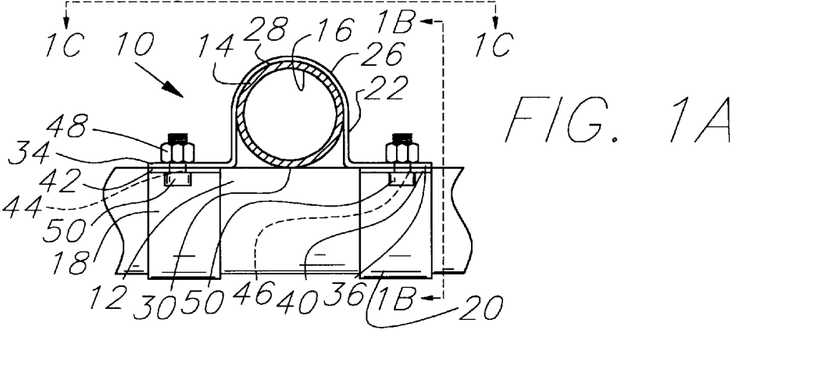
FIG. 1A is an elevational view, in section, of an embodiment of a connector assembly in accord with the present invention.
Figure 1B:
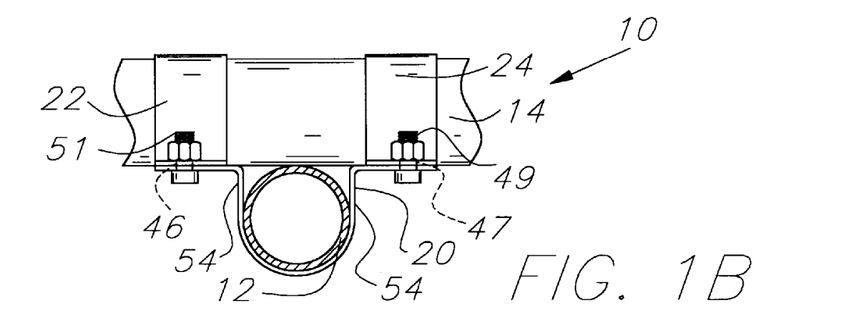
FIG. 1B is a cross-sectional view along line 1B—1B of FIG. 1A.
Figure 1C:
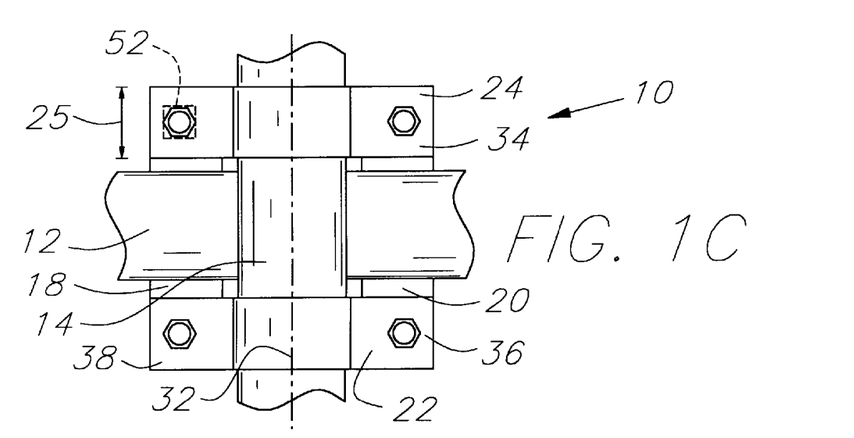
FIG. 1C is a plan view of the connector assembly of FIG. 1A.

Referring now to the drawings, and more particularly to FIG. 1, a configuration of pipe clamp 10, in accord with the present invention, is illustrated. Pipe clamp 10 may be used to secure pipes 12 and 14 together orthogonally with respect to each other. The elements that make up pipe clamp 10 and embodiments thereof are relatively inexpensive. For instance, all these elements may presently be obtained for about $2.00 each for each clamp, or less, as compared with other available pipe clamps that presently cost over $30.00 each. Although suitable elements are widely available as will be known to those skilled in the art, at least one specific name brand is provided hereinafter. Furthermore, pipe clamp 10 and the embodiments thereof are usable with pipes having different cross-sectional shapes and pipes of different diameters. In usage, pipe clamp 10 and embodiments thereof may be added or removed without movement of the pipes which is not possible in many presently available pipe clamps. Pipe clamp 10 or embodiments thereof may be used in structures such as building, scaffolds, racks, trailers, and the like which may be conveniently framed by using pipes as a basic structural element.

Figure 4A:
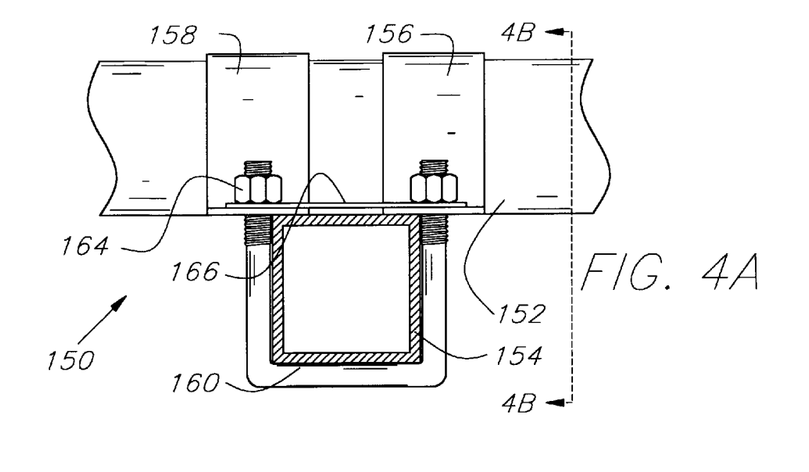
FIG. 4A is an elevational view, in section, of a fourth embodiment of a connector assembly in accord with the present invention.
Figure 4B:
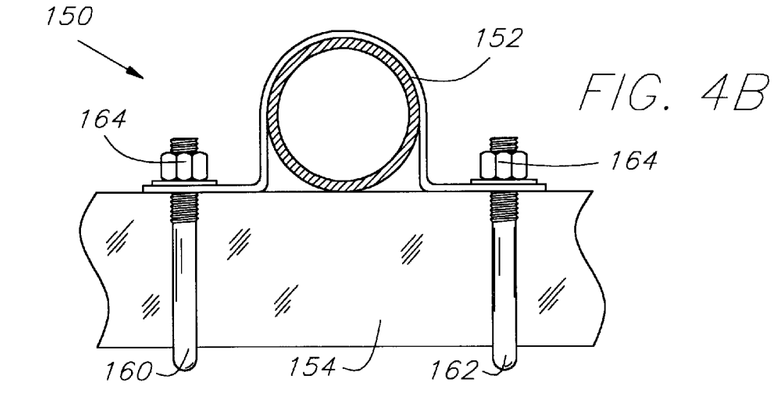
FIG. 4B is a cross-section view along line 4B—4B of FIG. 4A.

Pipes 12 and 14 may have a cylindrical cross-section 16 as shown in FIG. 1A or have other cross-sections such as a square cross-section as shown in FIG. 4B. It will be clear that rectangular or other cross-sectional types of tubes could be used as well, as discussed in more detail hereinafter. Furthermore, clamp 10 may be used when the cross-sections are of different types so that a cylindrical pipe may be connected to a square cross-sectional type of pipe as discussed hereinafter.

Figure 6A:
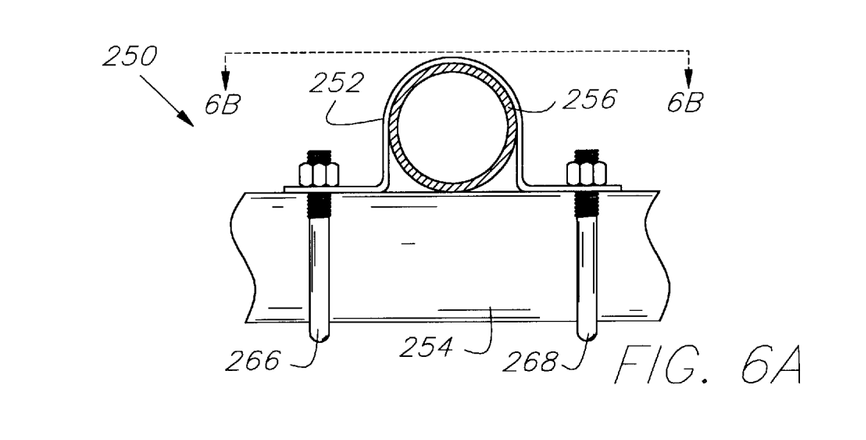
FIG. 6A is an elevational view, in section, of a sixth embodiment of a connector assembly in accord with the present invention.
Figure 6B:
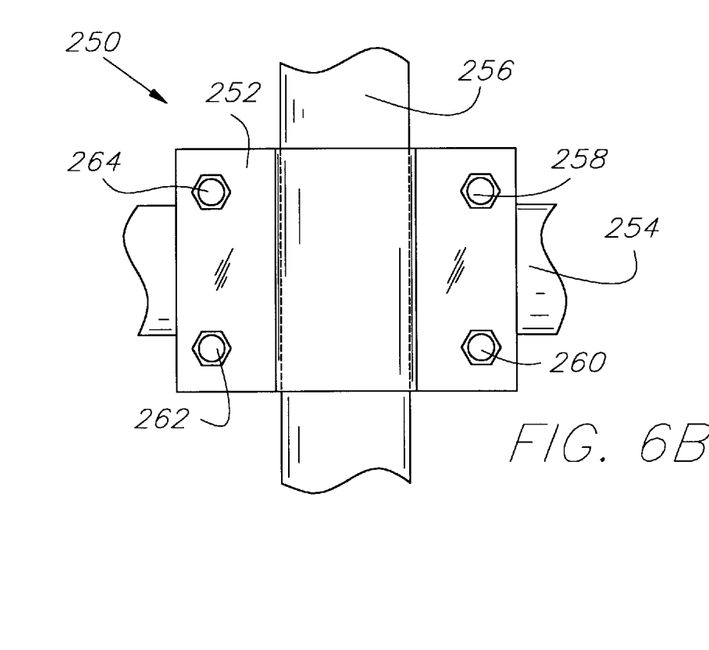
FIG. 6B is a plan view the embodiment shown in FIG. 6A.

Pipe clamp 10 includes four straps 18, 20, 22, and 24, each strap being fitted for use with a particular diameter pipe, and typically being widely available at many hardware distribution locations at a quite low cost roughly in the approximate range of $0.25 to $0.50, especially for large quantities, at the time of this writing. These straps may be substantially similar or even identical to keep the cost at a minimum, except for differences as discussed below. As well, since pipe clamp 10 may be used with different diameter pipes, such as, for instance 1" pipe and ¾" pipe, straps may differ in the size of radius or outside diameter 26 that is used that is generally U-shaped and mates to the outer profile 28 of the respective pipe. Pipe straps 18, 20, 22, and 24 have a width 25 that is suitable for their application which may typically be about 1 inch or may typically range of about 0.5 inches to 1.5 inches. However, the widths may be adjusted as desired for the type of application and FIG. 6 discusses a wider width strap, that is not normally readily available. A preferred type of strap is distributed by McMaster-Carr™ and the part number for the one inch pipe strap with two ears is #3039T16. For the ¾ inch pipe clamp, the McMaster-Carr™ part number is #3039T15.

These types of straps have a thickness that makes them particularly and suitably strong for this type of application. The strap thickness may preferably range from about ¹⁄₃₂" to ⅛" or be adjusted as necessary where additional strength is necessary or reduced for lightweight operation. In other words, the thickness may be adjusted for the application, as desired. As well, these straps may be ridged or otherwise have strengthening sections or grooves.

As can be seen in FIG. 1A, straps 22 and 24 are positioned around outer profile 28 of pipe 14 on the distal side of pipe 14 with respect to pipe 12. Due to pressure produced by the straps, pipes 12 and 14 intersect securely at region 30. The pipe straps control the positioning of the pipes so effectively that no additional saddle or adjusting material or mountings between the pipes are necessary. However, if desired, a mating saddle for the two pipes could be used although the additional costs of manufacturing the saddle and any required modifications to the components may outweigh advantages of the saddle, if any.

The set of pipe clamps essentially includes two pairs of straps. The first pair is comprised of straps 18 and 20. The second pair of straps is comprised of straps 22 and 24. As best shown in FIG. 1C, it will be noted that straps 18 and 20 are rectangular such that their longest side or length is parallel with respect to each other and is also parallel to pipe 14 and the axis 32 thereof. Likewise, straps 22 and 24 are parallel to each other and parallel to pipe 12.

The corresponding ends or ears 34 and 36 of second pair of straps 22 and 24 each connect to the same strap 20. In a similar manner, the corresponding ends of each pair of straps always connects to one strap of the other pair of straps. Stated in another way, each strap has two ears, such as ears 36 and 38, that connect respectively to ears of two other straps, such as respective ears 40 and 42, of straps 20 and 18, respectively, as shown by FIG. 1A and FIG. 1C. Thus, each strap is secured to two other straps at the ears.

For fastening purposes, each ear preferably has a mounting hole that mates to the mounting hole of another ear. The mounting holes are aligned are as aligned holes 44 and 46. Although any type of suitably reliable fasteners could be used that would secure the ears together, the preferred fastener is a nut-bolt combination such as nut 48 and bolt 50. Today's workmen are normally equipped with electric nut drivers so that having additional bolts is not problematical in terms of construction time. Having at least four fasteners provides greater fabrication flexibility than many existing pipe clamps. For instance, some presently available clamps cannot be installed or removed without movement of the pipes forming the connection thereby being susceptible to construction time loss if changes need to be made or other problems arise.

In a preferred embodiment of the invention, nuts 48 and bolts 50 may be preassembled with straps 18, 20, 22, and 24 and treated with solutions such as those distributed by McMaster Carr including Loctite™ Black Max 300 #74555A65, 1 oz $16.72, or 3M™ Pronto Series Instant Adhesive CA-B, #75445A69, 1 oz. $11.30. After curing and after the bolts are subsequently removed, the nuts will be effectively secured to the respective straps. In this way, the workman does not have to hold both the nut and bolt during initial assembly, thereby speeding the process. The treatment also acts to prevent loosening of the threaded connection after being made up. Alternatively, the nut or bolt may be tack-welded or otherwise glued to a respective strap so that it is very firmly attached to save the workman from having to hold both the bolt and nut.

The placement of mounting holes, such as mounting hole 44 or 46, will also affect strength of the connection so that the closer the hole and fasteners is placed towards the pipe, the stronger the connection will be. That is, referring to FIG. 1B, for maximum strength, holes 46 and 47, along with corresponding fasteners 51 and 49, would be as close to the connecting segments 54, shown as being vertical in FIG. 1B, as possible so as to be best aligned with the forces. Bolt 50 is usually a hex head bolt. The closer bolt 50 is to pipe 16, the stronger is the connection. When welding nut 48 to strap 34, it is preferable that nut 48 is a square nut because a square nut has more metal to make it more weldable. This feature is shown in dashed as nut 52 in FIG. 1B is indicated as a square nut and the additional metal of a square nut is apparent as shown. However, if nut 48 is not welded, then sufficient room must be provided to allow the workman to hold nut 48 with a wrench. Instead of welding nut 48, a locking arrangement may be desirable such as might include a double nut (not shown) or one of many lock or stop nuts readily available on the market. While the possibility of placement of changing the position of mounting holes is discussed above, it has been found that the thickness of the clamps may be sufficiently strong that the original placement of the mounting holes is suitable even for highly stressed applications. Nonetheless, the spacing could be changed, if desired.

Straps are not normally available with ears at a sharp right angle, but such could be provided in that manner, if desired. It will be noted that moving nut 48 closer to pipe 16 allows pipe clamp 10 to be smaller and make room for another closely spaced connection, if desired.

Figure 2A:
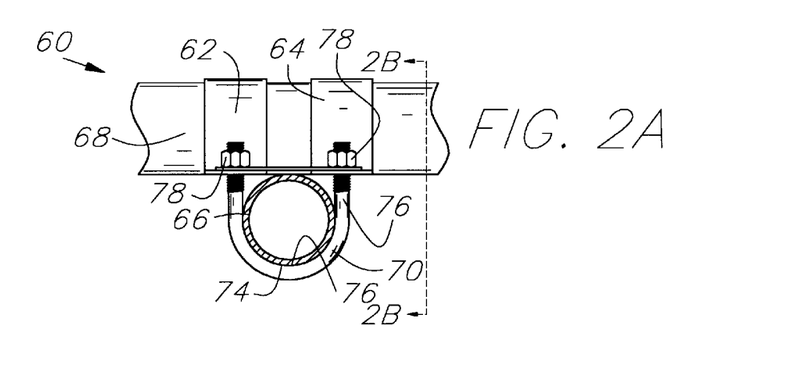
FIG. 2A is an elevational view, in section, of a second embodiment of a connector assembly in accord with the present invention.
Figure 2B:
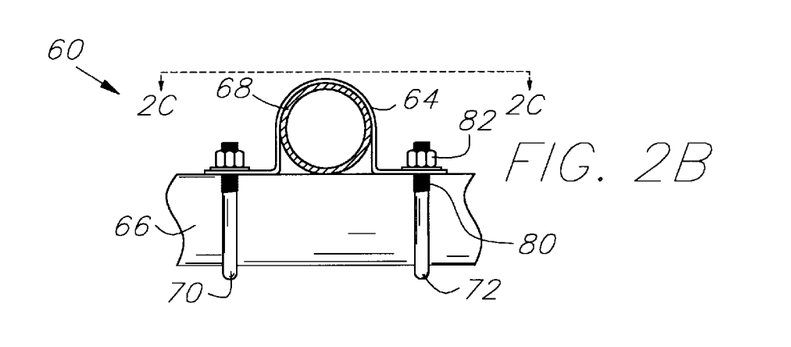
FIG. 2B is a cross-section view along line 2B—2B of FIG. 2A.
Figure 2C:
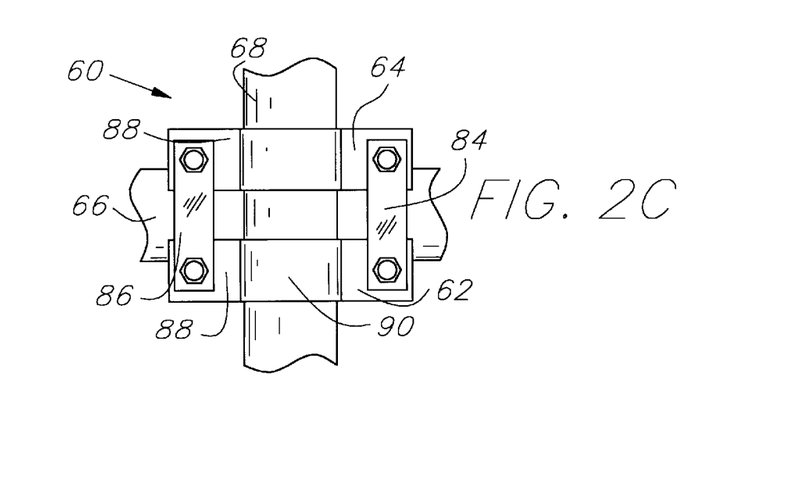
FIG. 2C is a plan view of the connector assembly of FIG. 2B.

A second embodiment 60 of a pipe connection in accord with the present invention is shown in FIG. 2A through FIG. 2C. Like embodiment 10 of the present invention, straps 62 and 64 are used to support one of the orthogonally positioned pipes, i.e, pipe 68, as discussed previously. However, in place of the straps for supporting the second pipe, i.e. pipe 66, U-bolt members 70 and 72 are used. Different diameter U-bolt members 70 and 72 may be selected as desired depending on the strength required in the application and availability. U-bolts are typically more expensive than straps but may still be purchased for from about seventy-five cents to one and one-half dollars each, depending mainly on the gauge selected. Representative U-bolts include the McMaster-Carr™ catalog item # 3043T43, that costs about eighty cents. Therefore, the cost of embodiment 60 of the present invention is also quite low as compared to other pipe connectors.

U-bolt members 70 and 72 are selected based on the type of pipe to have an internal mating surface 74 that is curved or otherwise shaped to mate with outer surface 76 of pipe 66. Mating surface 74 preferably makes contact over about 180 degrees of pipe 66. As with the straps discussed hereinbefore, the connection part 76 of the bolt between mating surface 74 and fastener 78 is orthogonal to both pipes 68 and 66. Bolt members 70 and 72 are effective shaped, solid, preferably rounded studs, that are readily available at many hardware stores. They could be provided with cross-sections if desired.

Fasteners 78 may be of different types but preferably utilize threads 80 and nuts 82 to make a connection. As with connection embodiment 10, at least four fasteners are preferably provided with one fastener per quadrant formed by the intersection of pipes 68 and 66 as viewed in FIG. 2C. To provide additional strength, straight straps 84 and 86 have been attached to the present embodiment. Each straight strap connects between the ends of a respective U-bolt, e.g. straight strap 84 connects between threaded ends 80 of U-bolt 72. Quite often, a straight strap such as strap 84 is supplied with the purchase of a U-bolt so there is no additional cost for strap 84. However, straight strap 84 is optional. Suitable washers may also be used in place of straight strap 84. Each straight strap 84 connects to the flat or ear portion 88 of two corresponding ends of straps 62 and 64. As previously, each strap 62 and 64 preferably has a rounded portion 90 with flat or ear portions 88 on either side thereof. Welding nut 78 to straps 62 and or 64, as discussed with previous embodiments, is not desirable for this embodiment.

Figure 3A:
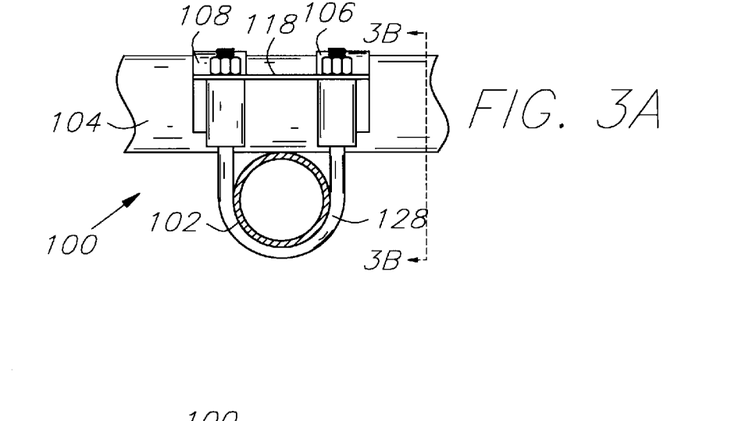
FIG. 3A is an elevational view, in section, of a third embodiment of a connector assembly in accord with the present invention.
Figure 3B:
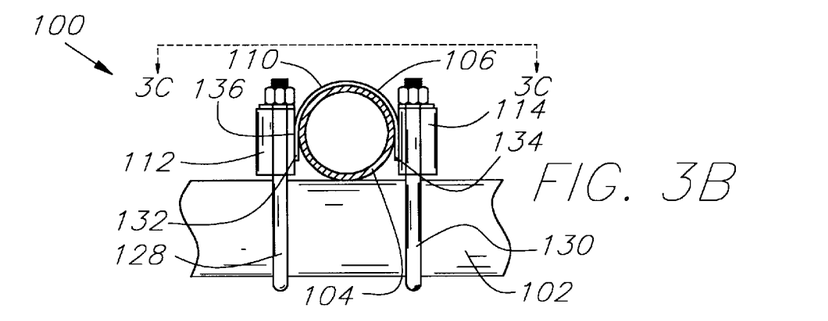
FIG. 3B is a cross-sectional view along line 3B—3B of FIG. 3A.
Figure 3C:
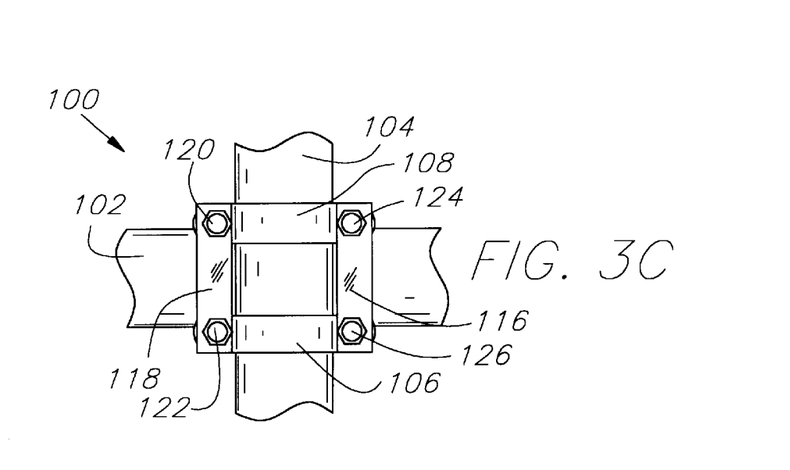
FIG. 3C is a plan view of the connector assembly of FIG. 3B.

Connection embodiment 100 is shown in FIG. 3A through FIG. 3C for connecting pipes 102 and 104. Connection embodiment differs functionally from connection embodiments 10 and 60 in that the clamping force may be tightened as desired whereas in the previously discussed embodiments, the clamping force is limited because of the location of the fasteners on the ears.

Connection embodiment 100 includes two pipe straps 106 and 108. Each pipe strap has a rounded portion 110 for mating with pipe 104. However, pipe straps 106 and 108 have affixed thereto, preferably by welding, cylindrical standoffs, such as standoffs 112 and 114. Straight straps 116 and 118 are used to support U-bolt ends 120, 122 and 124, 126, respectively. Ends 120, 122 are associated with U-bolt 128 and ends 124, 126 are associated with U-bolt 130. Pipe straps 106 and 108 may or may not include ears such as ears or flats located at positions 132 and 134 because the cylindrical standoffs may be welded onto the pipe straps outer surface, such as outer surface 136 of pipe strap 106. When using very low cost off-the-shelf components as is normally preferable, it may not be practical to retain ears 132 and 134 because the holes in the off-the-shelf straps are not normally aligned with the U-bolts, such as U-bolt 130. Also, straps are not normally provided with ears at a sharp right angle. However, tubes such as standoffs 112 and 114 could be ground to accomodate the radius. Straight straps 116 and 118 are optional. If straight straps 116 and 118 are not used, then flat washers are preferably used. It should be noted that the diameter or width of the straight straps or washers should not be so great that they make contact with the outer surface of the straps so as to rub against the straps and interfere with tightening. Connection embodiment 100 has the advantage of being adjustable for tightening, but has the disadvantage of being slightly more costly because pipe straps with the cylindrical standoffs are not standard components and need to be specially manufactured. However, the relative cost for making the straps modified as necessary is relatively low.

Connection embodiment 150 illustrates some of the excellent fabrication flexibility of the connection of the present invention. Here, connection embodiment 150 is used to connect pipes that have different cross-sectional shapes. Pipe 152 has a round cross-section and pipe 154 has a square cross-section.

U-bolts 160 and 162 are shown in engagement with square cross-sectioned pipe 154. However, other elements could be used for this purpose. For instance, pipe straps 156 and 158 could be modified or selected with a square internal shape for this purpose, if desired. Generally, square or rectangular straps are not readily available whereas right angle U-bolts may be readily acquired. If pipe straps with square internal shape were used to secure the square cross-sectioned pipe, then preferably the U-bolts would be provided with a round cross-section and could then be used to secure the round cross-sectioned pipe. Other possible components are discussed hereinafter.

Preferably, four threaded fasteners, such as nut-bolt end combination 164 are used, as in the other embodiments of the present invention. Strengthener straps 166 may also be provided, as desired. Pipes 152 and 154, or other pipes discussed hereinbefore, could also be of significantly different diameters as discussed hereinafter.

Figure 5A:
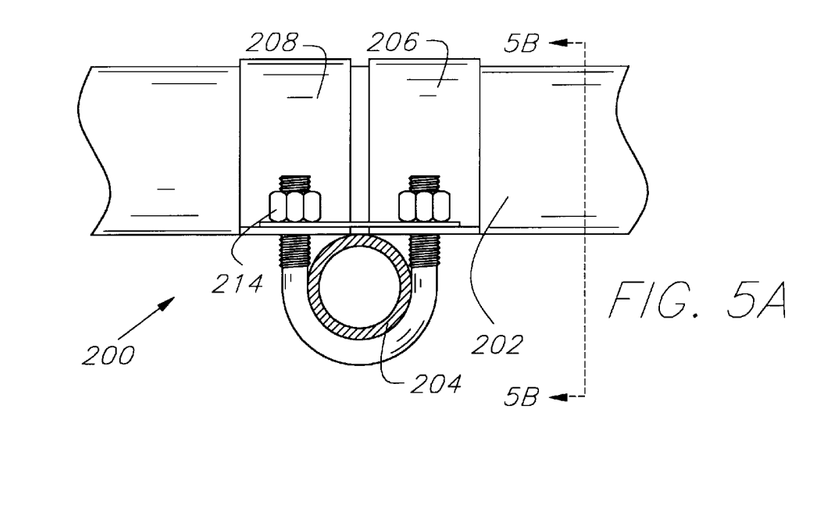
FIG. 5A is an elevational view, in section, of a fifth embodiment of a connector assembly in accord with the present invention.
Figure 5B:
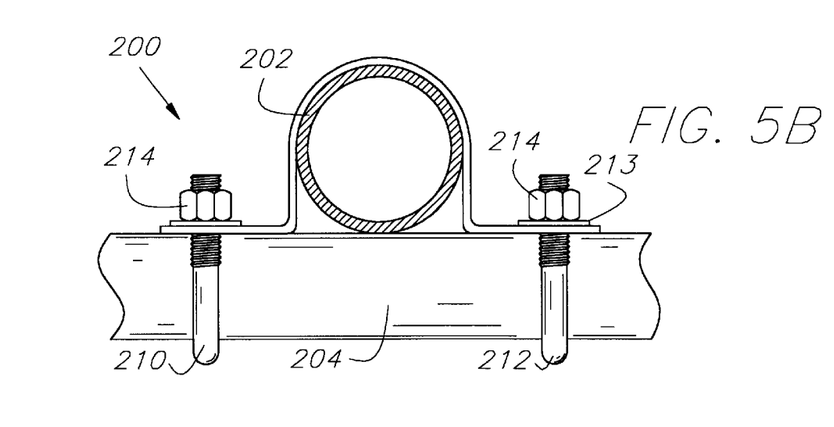
FIG. 5B is a cross-section view along line 5B—5B of FIG. 5A.

Connection embodiment 200, shown in FIG. 5A and FIG. 5B discloses use of the present invention for joining pipes of different diameters, namely large diameter pipe 202 and small diameter pipe 204. The components are readily available or easily manufactured as before, and simply require selection of size. It will be understood that any of the previously discussed connection embodiments are available for the function illustrated in FIG. 5A and FIG. 5B.

It should be noted that while pipe strap members 206 and 208 are shown holding large diameter pipe 202, other elements could also be used for this purpose. For instance, U-bolt members 210 and 212 could also be used for this function if selected appropriately. In this case, strap members 206 and 208 would preferably be selected to fit small diameter pipe 204. Or for another example, two sets of strap members could be used for this purpose as discussed in FIG. 1A through FIG. 1C with each set of strap members being selected according to the appropriate size. Four threaded fasteners 214 are used for securing the elements of connection embodiment 200 together. As discussed previously, nut-bolt fasteners are preferably used but other types of fasteners that may include clamps, locks, special fittings, and the like, could be used.

Depending on availability and cost, the U-bolt can also be provided for the larger pipe and the straps. Normally for economy, the arrangement shown in FIG. 5A and FIG. 5B is preferred.

Connection embodiment 250, shown in FIG. 6A and 6B discloses yet another configuration that may be used. In this case, a single wide pipe strap 252 replaces the two pipe straps shown in all previous embodiments for joining two pipes 254 and 256. Single wide pipe strap 252 has four fasteners 258, 260, 262, and 264, with one fastener located in each quadrant formed by the intersection of pipes 254 and 256, as shown in FIG. 6B. That is at least one fastener is provided for each corner of the intersection. In embodiment 250, two U-bolts 266 and 268 are connected to each side of single wide pipe strap 252. While not shown, two pipe straps, such as single wide pipe strap 252 could be used and joined together to form the connection of embodiment 250. This connection has the advantage of having fewer components and providing a strong connection, but has the disadvantage that such wide pipe straps are not readily available. However, such straps could be readily manufactured, if desired.

To summarize connection embodiment 250, straps such as 252 are not normally available and would restrict flexibility for connecting unlike pipe diameters. However, because strap 252 has more surface contact than other connections discussed hereinbefore, this connection can be quite strong.

Other variations that could be made in this and earlier embodiments include use of more than one set of two U-bolt connectors (not shown). In that case, there would be two fasteners per quadrant rather than the construction shown in the previous embodiments where each embodiment has one fastener per quadrant with the quadrants being located at each of the four corners of the intersection formed when the two pipes that are joined. It will also be noted that various means known to those skilled in the art may be used to prevent the threaded connections from becoming loosened due to vibration and other stresses over time.

The foregoing disclosure and description of the invention is illustrative and explanatory thereof, and it will be appreciated by those skilled in the art, that numerous changes, only some of which have been mentioned hereinbefore, in the diameters, shape and materials as well as in the various details of the illustrated construction or combinations of features of the various pipe strap elements may be made without departing from the spirit of the invention.

What is claimed is:

1. A construction arrangement, comprising:
   first and second structural members each laid angularly adjacent another;
   a first pair of elongate strap members, each of said first pair of strap members having a cross-section that mates to an outer profile of said first structural member, each of said first pair of elongate strap members extending around said outer profile of said first structural member and positioned so as to be distal said second structural member, each of said strap members having an end thereof with a mounting hole therein such that each said strap member has two mounting holes and said first pair of elongate strap members has four mounting holes, said strap members being positioned substantially parallel with respect to each other;
   a second pair of elongate mounting members, each of said mounting members having a cross-section that mates to an outer profile of said second structural member distal said first structural member, each of said mounting members extending around said outer profile of said second structural member, each of said elongate mounting members being parallel with respect to each other, said second pair of elongate mounting members being substantially similar to said first pair of elongate strap members; and
   a fastener for each of said four mounting holes, respectively.

2. The arrangement of claim 1, wherein said fastener includes:
   a first threaded insert member section extending through a respective first of said four mounting holes; and
   a first threaded receptor element for engaging said first threaded member sections.

3. The arrangement of claim 1, wherein said fastener includes:
   a threaded element welded to said first pair of elongate strap members at each of said four mounting holes.

4. The arrangement of claim 1, wherein
   said fastener for each of said four mounting holes further comprises:
   four nuts adhesively secured to said four mounting holes.

5. The arrangement of claim 1, wherein
   said fastener for each of said four mounting holes further comprises:
   four nuts weldably secured to said four mounting holes.

6. The arrangement of claim 1, wherein:
   said first and second structural members have corresponding first and second diameters, said first and second diameters being unequal.

7. A construction arrangement for connecting first and second structural members each laid angularly adjacent another to form a cross and defining four separated regions at an intersection therebetween, said first structural member having a first outer surface on an opposite side of said cross with respect to a second outer surface of said second structural member forming said cross, said construction arrangement comprising:
   no more or less than two parallel elongate first strap members, each of said no more or less than two parallel elongate first strap members being extendable around and each being bent so as to be conformable in shape to said first outer surface of said first structural member, each of said no more or less than two parallel elongate first strap members having a width and a thickness, said width being at least four times greater than said thickness;
   at least two parallel elongate second strap members being conformable in shape and being extendable around said second outer surface of said second structural member on a side thereof opposite from said first structural member and said no more or less than two elongate first strap members; and
   at least four fasteners being provided for fastening said first and second strap members, said at least four fasteners being positioned such that at least one fastener is in each of said four separated regions.

8. The arrangement of claim 7, further comprising:
   said at least two parallel elongate second strap members comprising a pair of bolt members being configured in a U-shape so as to form U-bolts, each U-bolt having two ends such that said pair of bolt members have four bolt ends, each of said bolt ends being positioned to extend through a respective of four mounting holes for said four fasteners, said four mounting holes being defined by said no more or less than two parallel elongate first strap members.

9. The arrangement of claim 8, further comprising:
   a pair of straight support straps, each of said straight support straps having two holes spaced such that said two holes mate with two ends of each of said first pair of bolt members, said pair of straight support straps being mounted to said pair of bolt members.

10. The arrangement of claim 8, further comprising:
    four respective cylindrical members, each of said cylindrical members defining a respective one of said four mounting holes.

11. The arrangement of claim 10, wherein:
    each of said cylindrical members is permanently secured to said no more or less than two parallel elongate first strap members.

12. The arrangement of claim 7, further comprising:
    said at least four fasteners comprising four threaded members being weldably or adhesively secured to said no more or less than two parallel elongate first strap members.

13. A method for securing first and second structural members orthogonally with respect to each other, comprising:
    placing said first and second structural members adjacent each other and in orthogonal relationship with each other so as to form an intersection with four quadrants;
    affixing one and only one first pair of strap members around said first member, said one and only first pair of strap members being affixed on a side of said first member opposite to said second member and substantially parallel to said second member, each of said one and only one first pair of strap members being planar so as to have a flat surface, each of said one and only one first pair of strap members having an arcuate section;

affixing another pair of strap members around said second member on a side of said second member opposite to said first member and substantially parallel to said first member; and fastening said first and second structural members with at least four fasteners positioned so that one fastener is fastened in each of said four quadrants.

14. The method of claim 13, wherein said steps of fastening further comprise, rotating threaded members.

15. The method of claim 13, said step of fastening further comprising:

welding two nuts for receiving bolts to each of said one and only one first pair of strap members for a total of four nuts of which said at least four fasteners are comprised.

16. The method of claim 13, further comprising:

affixing an additional pair of straight straps across ends of said one and only one first pair of strap members.

17. The method of claim 13, further comprising:

selecting said first and second structural members to have different diameters.

18. The method of claim 13, said step of fastening further comprising:

adhesively mounting two threaded members to each of said one and only one first pair of strap members for a total of four threaded members of which said at least four fasteners are comprised.

* * * * *